Dec. 2, 1969 HISAO KANAMORI 3,481,807
METHOD OF JOINING THE ENDS OF A CONVEYER BELT
REINFORCED WITH STEEL STRANDS
Filed July 19, 1966 2 Sheets-Sheet 1

INVENTOR.
HISAO KANAMORI
BY
Eugene E. Geoffry Jr
ATTORNEY

Dec. 2, 1969  HISAO KANAMORI  3,481,807
METHOD OF JOINING THE ENDS OF A CONVEYER BELT
REINFORCED WITH STEEL STRANDS
Filed July 19, 1966  2 Sheets-Sheet 2
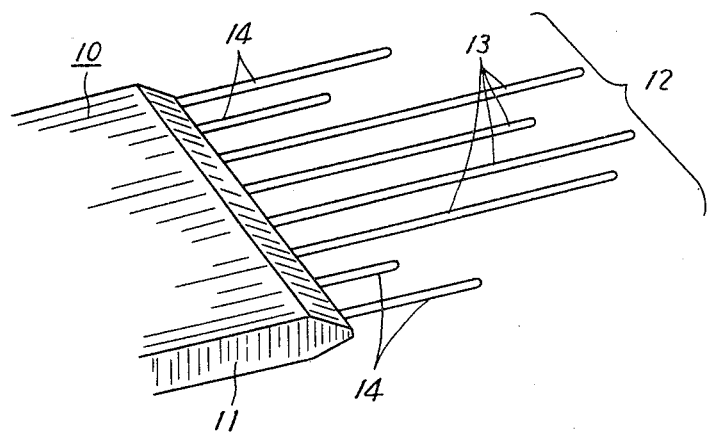
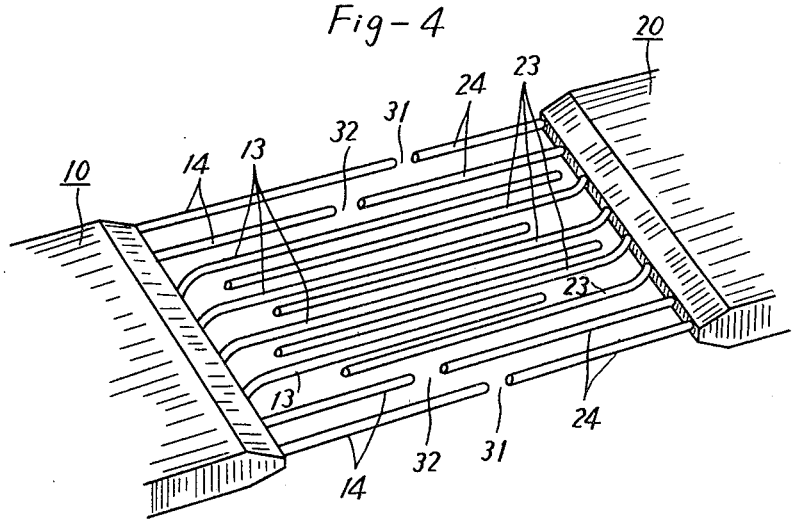
INVENTOR.
HISAO KANAMORI

United States Patent Office 3,481,807
Patented Dec. 2, 1969

3,481,807
METHOD OF JOINING THE ENDS OF A CONVEYOR BELT REINFORCED WITH STEEL STRANDS
Hisao Kanamori, Kobe, Japan, assignor to Mitsubishi Belt Kabushiki Kaisha, Kobe, Japan, a Japanese company
Filed July 19, 1966, Ser. No. 566,373
Claims priority, application Japan, Aug. 11, 1965, 40/49,074
Int. Cl. C09j 5/06; B29h 9/10; B32b 3/14
U.S. Cl. 156—159   4 Claims

ABSTRACT OF THE DISCLOSURE

The method of joining the ends of a conveyer belt by stripping a portion of the belt body from each belt end to expose the strands, bringing the belt ends together to interlace a central group of strands and cutting at least two outer strands on each end to axially align them and have the ends in spaced relationship, and then adhering a covering material to the strands and adjoining belt ends to form a complete endless belt.

---

This invention relates to conveyer belts and more specifically to a novel and improved joint for conveyer belts and method of forming said joint in belts which are reinforced with steel wires or cables embedded in the belt itself.

Conveyer belts are usually formed of rubber or other similar material, and many belts utilize canvas layers to provide adequate tensile strength. In the case of belts requiring exceedingly high tensile strength for high speed and long distance operation, strands of steel wire or cable are generally embedded in the belt. These steel reinforcing strands are preferably placed in the center plane of the belt and extend throughout the width of the belt. This arrangement of the strands provides substantially uniform loading on each strand and avoids wear which may otherwise occur. Furthermore, a nonuniform arrangement of the strands would cause undesirable weaving of the belt.

The joinder of belts utilizing steel strands has presented numerous difficulties particularly because of the discontinuity produced by the joint. One procedure heretofore utilized for joining belt ends has been to cut the strands protruding from the ends of the belt so that they may be placed in abutting relationship with the abutments being staggered. An alternative procedure heretofore utilized has been to interlace the strand ends. Both of these procedures have not been found satisfactory and accordingly one objective of the invention is to provide a novel and improved conveyer belt joint which affords improved belt continuity and thereby materially extends the life of the belt.

Another object of the invention resides in the novel and improved belt joint and the method of forming the joint which avoids the loss of tensile stress at the joint.

Still another object of the invention resides in a novel and improved method for joining the ends of a conveyor belt having steel strands which minimizes irregularity of the arrangement of the steel strands at the joint portion.

The above and other objects and advantages of the invention will become more apparent from the following description and accompanying drawings forming part of this application.

In the drawings:
FIGURES 1 and 2 are perspective views of conventional methods for joining the ends of a belt embodying steel strands.

FIGURE 3 is a perspective view of one belt end with the steel strands cut to selected lengths in accordance with the invention.

FIGURE 4 is a perspective view of the arrangement and interlacing of steel strands of belt ends to be joined in accordance with the invention.

Figure 1:
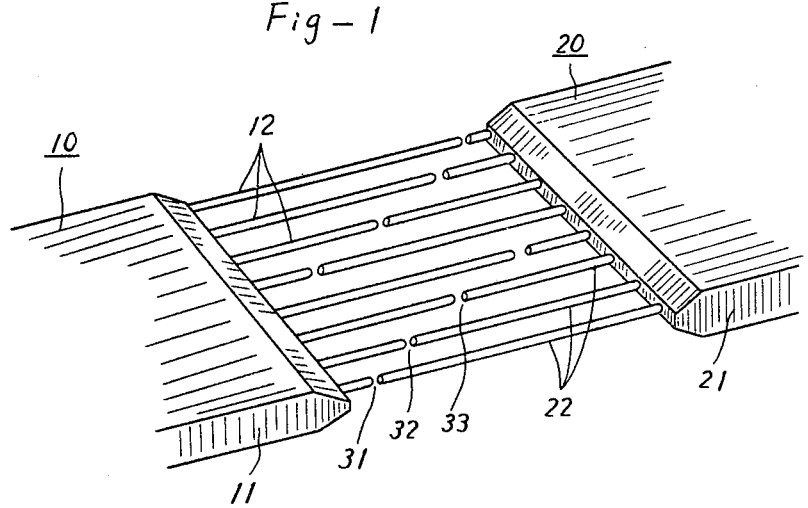

One conventional procedure for joining belt ends is illustrated in FIGURE 1 and wherein the belt ends to be joined are denoted by the numerals 10 and 20. The projecting ends of the steel strands are denoted by the numerals 12 and 22, and these strands project from the rubber coverings 11 and 21. The strands 12 and 22 are arranged to mutually abut one another leaving minute gaps 31, 32, 33, etc. It is desirable to select the positions of the gaps 31, 32, 33, etc., so that the gaps are not in line.

With the foregoing procedure it is necessary to have a joint length of sufficient magnitude to provide appreciable area for bonding the rubber covering and thereby provide the necessary strength. The utilization of long joints has a serious disadvantage in the belt characteristics and experience has indicated that such belts become troublesome.

Figure 2:
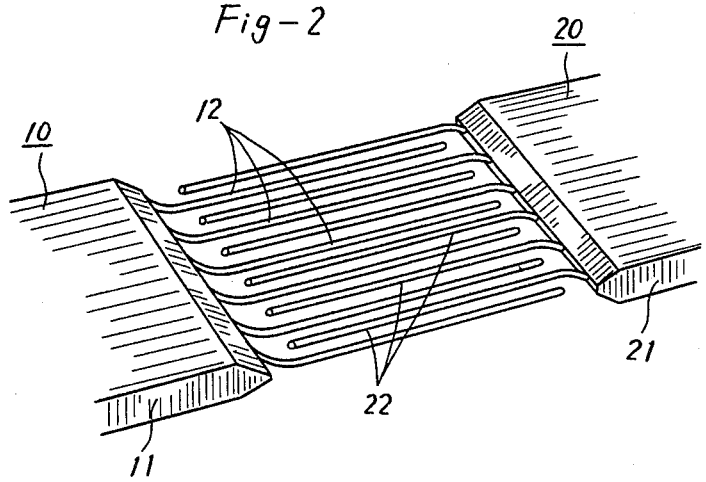

A modified conventional arrangement is shown in FIGURE 2. In this instance the strand ends 12 and 22 are interlaced by offsetting the strands projecting from each belt ends 10 and 20. This method of joining belt ends enables the utilization of a shorter joint length and sufficient strength is obtained because of the increased bonding area of each strand with the rubber covering. It will be observed, however, that the strands must be offset to enable them to be interlaced and this offsetting results in the introduction of a substantial discontinuity which adversely affects the belt characteristics and further results in an impairment of the belt because of the reduced section of rubber overlying the edges of the joint.

This invention overcomes the aforementioned difficulties experienced with structures such as those shown in FIGURES 1 and 2 and attains this end through an improved arrangement of the strand ends which facilitates maintenance of continuity of the belt, and at the same time permits the use of a relatively short joint without loss of tensile strength. More specifically and with reference to FIGURE 3, a group of central strands 13 are cut at slightly different lengths with the longest strand or strands, as the case may be, being substantially equivalent to the finished strand joint. The outer sets of strands 14 are cut to substantially shorter lengths than the central strands and the lengths of the strands 14 are preferably varied. The numeral 12 in this figure is intended to denote the entire group of strands 13 and 14.

FIGURE 4 shows the relationship of the strand ends which extend from the belt ends 10 and 20 to be joined in accordance with the invention. It will be observed that the strands protruding from the belt ends 20 are cut in a similar manner to that described in connection with FIGURE 3. For instance, the central group of strands 23 projecting from the belt end 20 are relatively long and of slightly varying lengths. The side strands 24, 24 are of shorter lengths and are coordinated with the lengths of the strands 14, 14 to provide narrow gaps 31, 31 and 32, 32.

The central groups of strands 13, 23 are interlaced by offsetting the strands as they emerge from the adjoining belt end. Since these strands are substantially equal to the joint length, a substantial bonding area is provided to afford high tensile strength. The slight discontinuity caused by offsetting of the strands 13 and 23 is minimized through the utilization of abutting outer sets of strands 14, 24. The number of central strands which are to be interlaced is determined by the nature of the belt and the purpose for which it is to be utilized. In general it is desirable to select the number of strands forming the central group and the number of strands forming the outside group so that the resultant joint will be well-balanced. One such arrangement that has been found effective involves a central strand group equal in number to the strands in the outer groups.

With the arrangement of the strands as described above, a bonding agent is applied to the strands and non-vulcanized rubber plates also coated with a bonding agent are placed over the exposed strands. The rubber plates are then vulcanized to complete the joining procedure.

The joint produced in accordance with the invention as described in connection with FIGURES 3 and 4 provides that tensile strength of a joint wherein all of the strands are interlaced as illustrated in FIGURE 2, and at the same time avoids the discontinuity produced by the structure shown in FIGURE 2 as well as the untidy appearance of both edges of the belt. As a result, an endless belt is provided having excellent characteristics and uniformity which minimizes belt wear and greatly extends belt life.

What is claimed is:
1. The method of joining the ends of a conveyer belt having a plurality of steel strands embedded in the body and extending lengthwise thereof comprising the steps of removing a portion of the belt body from each belt end to be joined to expose said strands, bringing together the belt ends, interlacing the central group of strands of one belt end with the central group of strands of the other belt end the lengths of the remaining outer strands being adjusted to permit axial alignment of corresponding outer strand ends of each belt end with aligned strand ends in spaced relationship to provide gaps therebetween, and then adhering a covering material to the exposed strand ends and to the belt ends to form a completed endless belt.

2. The method according to claim 1 wherein said belt body is formed of rubber and said covering material is unvulcanized rubber and wherein said method further includes the step of vulcanizing said rubber to effect permanent adherence to said strands and to the belt ends being joined.

3. The method according to claim 1 wherein the number of strands for the central group of each belt end is approximately equal to the total number of outer strands on each side of said central group.

4. The method according to claim 1 wherein said gaps between corresponding outer strand ends are axially offset one from the others.

References Cited
UNITED STATES PATENTS

| | | | |
|---|---|---|---|
| 3,234,611 | 2/1966 | Paasche | 24—38 |
| 1,735,686 | 11/1929 | Kimmich | 24—38 |
| 3,101,290 | 8/1963 | Paul | 161—36 XR |

PHILIP DIER, Primary Examiner

U.S. Cl. X.R.

24—38; 74—232; 161—36, 145; 198—193